Rufus Joslin.
Reversible Picker.

No. 74545 — Patented Feb 18 1868

Inventor.
Rufus Joslin

Witness. W. B. Vincent
R. J. Angell

United States Patent Office.

RUFUS JOSLIN, OF PAWTUCKET, RHODE ISLAND.

Letters Patent No. 74,545, dated February 18, 1868.

IMPROVEMENT IN PICKER FOR LOOMS.

*The Schedule referred to in these Letters Patent and making part of the same.*

TO ALL WHOM IT MAY CONCERN:

Be it known that I, RUFUS JOSLIN, of Pawtucket, in the county of Providence, and State of Rhode Island, have invented a new and useful Reversible Picker for Looms; and I do hereby declare that the following specification, taken in connection with the drawings making a part of the same, is a full, clear, and exact description thereof.

My invention consists of a picker for looms, made of leather or other material, and so formed and constructed that, as soon as one end has become so worn, by striking against the point of the shuttle, as would, with pickers of the old class, render a new one indispensably necessary, it may be reversed upon the picker-staff, and be for all purposes a new picker.

The picker now in common use generally lasts from six weeks to two months, according to the weight of the material being manufactured, and the substance upon which the picker-staff is allowed to strike at the completion of its inward movement, and requires in its manufacture a much larger amount of material than the one which is the subject of my invention, the latter weighing five more to the pound, and having, in addition, the capacity of being reversed, which increases its durability to twice the time of the old class of pickers.

Figure 1:
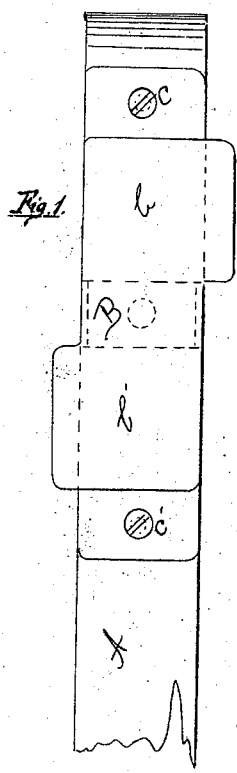
Figure 1 shows my invention and a portion of the picker-staff.
Figure 2:
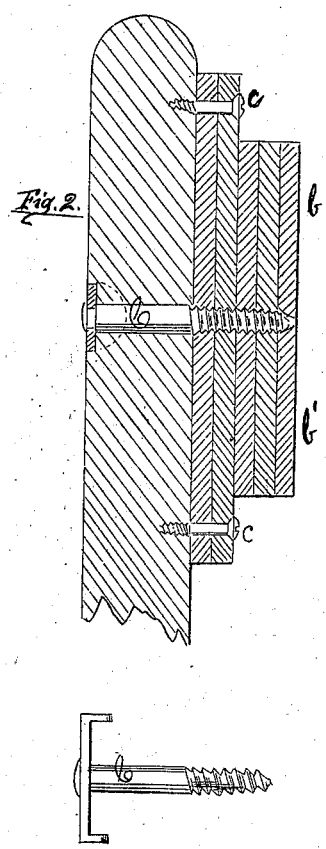
Figure 2 shows the manner in which the same is attached to the staff.
Figure 4:
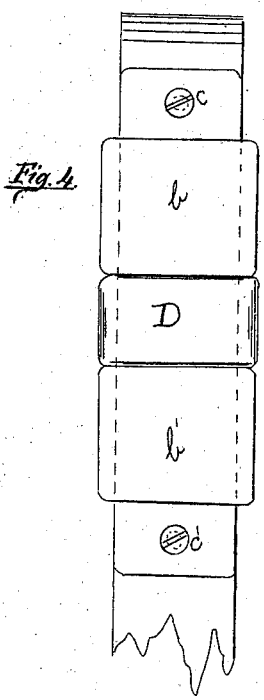
Figures 4 and 5 show my invention attached by a strap in the well-understood way.
Figure 5:
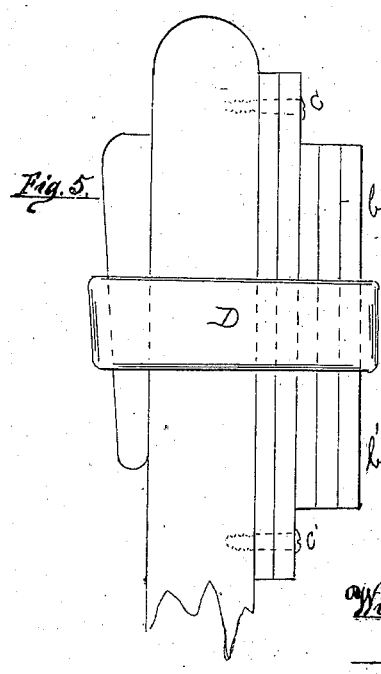

In the accompanying drawings, A, fig. 1, represents the upper part of the picker-staff, and B a reversible picker, attached thereto by means of a screw, C, and small screws $c\ c'$, as shown in fig. 2, or by a strap, D, as in figs. 4 and 5.

Figure 3:
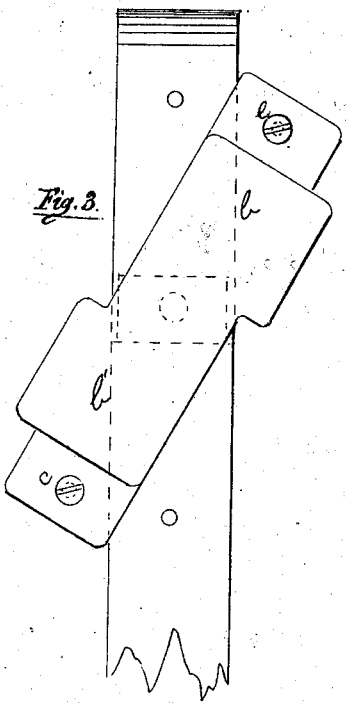
Figure 3 shows the picker partially reversed.

The constant strokes of the picker upon the shuttle soon wear a hole at the point $b'$, and render the picker in that position of no further use. I then take out the screws $c\ c'$, and turn the picker around upon the screw C, in the direction indicated in fig. 3, until it reaches its proper position, when I again insert the screws $c\ c'$, and, upon motion being given to the picker, it will strike the point of the shuttle at $b$ instead of at $b'$, as before being reversed.

What I claim as my invention, and desire to secure by Letters Patent, is—

The combination of the picker-staff, screw C, and reversible picker, constructed and arranged substantially as and for the purposes specified.

RUFUS JOSLIN.

Witnesses:
W. B. VINCENT,
R. J. ANGELL.